US 6,654,507 B2

(12) United States Patent
Luo (10) Patent No.: US 6,654,507 B2
(45) Date of Patent: *Nov. 25, 2003

(54) AUTOMATICALLY PRODUCING AN IMAGE OF A PORTION OF A PHOTOGRAPHIC IMAGE (75) Inventor: Jiebo Luo, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 334 days.

This patent is subject to a terminal disclaimer.

(21) Appl. No.: 09/736,825

(22) Filed: Dec. 14, 2000

(65) Prior Publication Data
US 2002/0114535 A1 Aug. 22, 2002

(51) Int. Cl.[7] ............................ G06K 9/20; H04N 1/387
(52) U.S. Cl. ..................... 382/282; 382/173; 345/620; 358/453
(58) Field of Search ................................ 382/291, 173, 382/180, 225, 282; 345/620–628; 358/453

(56) References Cited

U.S. PATENT DOCUMENTS

| 4,809,064 A | | 2/1989 | Amos et al. | |
|---|---|---|---|---|
| 5,640,468 A | * | 6/1997 | Hsu | 382/190 |
| 5,781,665 A | * | 7/1998 | Cullen et al. | 382/254 |
| 5,872,619 A | | 2/1999 | Stephenson et al. | |
| 5,872,643 A | | 2/1999 | Maeda et al. | |
| 5,880,858 A | * | 3/1999 | Jin | 358/487 |
| 5,978,519 A | | 11/1999 | Bollman et al. | |
| 5,995,201 A | | 11/1999 | Sakaguchi | |
| 6,091,841 A | * | 7/2000 | Rogers et al. | 382/132 |
| 6,282,317 B1 | * | 8/2001 | Luo et al. | 382/203 |
| 6,335,985 B1 | * | 1/2002 | Sambonsugi et al. | 382/190 |
| 6,430,320 B1 | * | 8/2002 | Jia et al. | 382/289 |
| 6,434,271 B1 | * | 8/2002 | Christian et al. | 382/194 |
| 6,456,732 B1 | * | 9/2002 | Kimbell et al. | 382/112 |

* cited by examiner

Primary Examiner—Bhavesh M. Mehta
Assistant Examiner—Aaron Carter
(74) Attorney, Agent, or Firm—Raymond L. Owens (57) ABSTRACT A method of producing an image of at least a portion of a digital image that includes pixels includes
computing a belief map of the digital image, by using the pixels of the digital image to determine a series of features and using such features to assign the probability of the location of a main subject of the digital image in the belief map determining a crop window having a shape and a zoom factor, which determine a size of the crop window and cropping the digital image to include a portion of the image of high subject content in response to the belief map and the crop window.

28 Claims, 10 Drawing Sheets

AUTOMATICALLY PRODUCING AN IMAGE OF A PORTION OF A PHOTOGRAPHIC IMAGE

CROSS REFERENCE TO RELATED APPLICATION

Reference is made to commonly assigned U.S. patent application Ser. No. 09/490,915, filed Jan. 25, 2000, entitled "Method for Automatically Creating Cropped and Zoomed Versions of Photographic Images" by Jiebo Luo et al., and assigned U.S. patent application Ser. No. 09/223,860, filed Dec. 31, 1998, entitled "Method for Automatic Determination of Main Subjects in Photographic Images", by Jiebo Luo et al., the disclosures of which are incorporated herein by reference.

FIELD OF THE INVENTION

This invention relates in general to producing an image of a portion of a photographic image by using digital image processing.

BACKGROUND OF THE INVENTION

For many decades, traditional commercial photofinishing systems have placed limits on the features offered to consumers to promote mass production. Among those features that are unavailable conventionally, zooming and cropping have been identified by both consumers and photofinishers as extremely useful additional features that could potentially improve the quality of the finished photographs and the subsequent picture sharing experiences. With the advent of, and rapid advances in digital imaging, many of the technical barriers that existed in traditional photography no longer stand insurmountable.

Hybrid and digital photography provide the ability to crop undesirable content from a picture, and magnify or zoom the desired content to fill the entire photographic print. In spite of the fact that some traditional cameras with zoom capability provide consumers greater control over composing the desired scene content, studies have found that photographers may still wish to perform a certain amount of cropping and zooming when viewing the finished photograph at a later time. Imprecise viewfinders of many point-and-shoot cameras, as well as simply second-guessing their initial compositions, are factors in the desirability of zoom and crop. In addition, it may be desirable to use some other regular border templates such as ovals, heart shapes, squares, etc. In another scenario, some people commonly referred to as "scrapbookers" tend to perform more aggressive crop in making a scrapbook, e.g., cutting along the boundary of objects.

There are significant differences in objectives and behaviors between these two types of cropping, namely albummaking and scrapbook making, with the latter more difficult to understand and summarize. The invention described below performs automatic zooming and cropping for making photographic prints. One customer focus group study indicated that it would be beneficial to provide customers a double set of prints—one regular and one zoom. Moreover, it is preferred that the cropping and zooming be done automatically. Most customers do not want to think about how the zooming and cropping is being done as long as the content and quality (e.g., sharpness) of the cropped and zoomed pictures is acceptable.

There has been little research on automatic zoom and crop due to the apparent difficulty involved in performing such a task. None of the known conventional image manipulation software uses scene content in determining the automatic crop amount. For example, a program entitled "XV", a freeware package developed by John Bradley at University of Pennsylvania, USA (Department of Computer and Information Science), provides an "autocrop" function for manipulating images and operates in the following way:

the program examines a border line of an image, in all of the four directions, namely from the top, bottom, left and right sides;

the program checks the variation within the line. In grayscale images, a line has to be uniform to be cropped. In color images, both the spatial correlation and spectral correlation have to be low, except for a small percentage of pixels, for the line to be qualified for cropping. In other words, a line will not be cropped if it contains a significant amount of variation;

if a line along one dimension passes the criterion, the next line (row or column) inward is then examined; and the final cropped image is determined when the above recursive process stops.

This program essentially tries to remove relatively homogeneous margins around the borders of an image. It does not examine the overall content of the image. In practice, the XV program is effective in cropping out the dark border generated due to imprecise alignment during the scanning process. However, disastrous results can often be produced due to the apparent lack of scene understanding. In some extreme cases, the entire image can be cropped.

Another conventional system, described by Bollman et al. in U.S. Pat. No. 5,978,519 provides a method for cropping images based upon the different intensity levels within the image. With this system, an image to be cropped is scaled down to a grid and divided into non-overlapping blocks. The mean and variance of intensity levels are calculated for each block. Based on the distribution of variances in the blocks, a threshold is selected for the variance. All blocks with a variance higher than the threshold variance are selected as regions of interest. The regions of interest are then cropped to a bounding rectangle. However, such a system is only effective when uncropped images contain regions where intensity levels are uniform and other regions where intensity levels vary considerably. The effectiveness of such a system is expected to be comparable to that of the XV program. The difference is that the XV program examines the image in a line by line fashion to identify uniform areas, while Bollman examines the image in a block by block fashion to identify uniform areas.

In summary, both techniques cannot deal with images with nonuniform background.

In addition, in the earlier invention disclosed in U.S. patent application Ser. No. 09/490,915, filed Jan. 25, 2000, the zoom factor needs to be specified by the user. There is, therefore, a need for automatically determining the zoom factor in order to automate the entire zoom and crop process.

Some optical printing systems have the capability of changing the optical magnification of the relay lens used in the photographic copying process. In U.S. Pat. No. 5,995,201, Sakaguchi describes a method of varying the effective magnification of prints made from film originals utilizing a fixed optical lens instead of zoom lens. In U.S. Pat. No. 5,872,619, Stephenson et al. describe a method of printing photographs from a processed photographic filmstrip having images of different widths measured longitudinally of the filmstrip and having heights measured transversely of the filmstrip. This method uses a photographic printer having a zoom lens and a printing mask to provide printed images having a selected print width and a selected print height. In U.S. Pat. No. 4,809,064, Amos et al. describe an apparatus for printing a selected region of a photographic negative onto a photosensitive paper to form an enlarged and cropped photographic print. This apparatus includes means for projecting the photographic negative onto first and second zoom lenses, each of the zoom lenses having an adjustable magnification. In U.S. Pat. No. 5,872,643, Maeda et al. describe a film reproducing apparatus that can effectively perform zoom and crop. This apparatus includes an image pick-up device which picks up a film frame image recorded on a film to generate image data, an information reader which reads information about photographing conditions of the film frame image, and a reproducing area designator which designates a reproducing area of the film frame image. However, the reproducing area of the film frame image is determined based on pre-recorded information about the position of the main object, as indicated by which zone of the photograph the automatic focusing (AF) operation in the camera was on-part of the recorded information about photographing conditions. In all the above-mentioned optical printing systems, the position of the photographic film sample and magnification factor of the relay lens are pre-selected.

SUMMARY OF THE INVENTION

According to the present invention, there is provided a solution to the problems of the prior art. It is an object of the present invention to provide a method for producing a portion of a photographic image by identifying the main subject of the photographic image.

According to a feature of the present invention, there is provided a method of producing an image of at least a portion of a digital image, comprising the steps of:

a) providing a digital image having pixels;

b) computing a belief map of the digital image, by using the pixels of the digital image to determine a series of features, and using such features to assign the probability of the location of a main subject of the digital image in the belief map;

c) determining a crop window having a shape and a zoom factor, the shape and zoom factor determining a size of the crop window; and d) cropping the digital image to include a portion of the image of high subject content in response to the belief map and the crop window.

ADVANTAGEOUS EFFECT OF THE INVENTION

One advantage of the invention lies in the ability to automatically crop and zoom photographic images based upon the scene contents. The digital image processing steps employed by the present invention includes a step of identifying the main subject within the digital image. The present invention uses the identified main subject of the digital image to automatically zoom and crop the image. Therefore, the present invention produces high-quality zoomed or cropped images automatically, regardless whether the background is uniform or not.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF THE INVENTION

The invention automatically zooms and crops digital images according to an analysis of the main subject in the scene. Previously, a system for detecting main subjects (e.g., main subject detection or "MSD") in a consumer-type photographic image from the perspective of a third-party observer has been developed and is described in U.S. patent application Ser. No. 09/223,860, filed Dec. 31, 1998, the disclosure of which is incorporated herein by reference. Main subject detection provides a measure of saliency or relative importance for different regions that are associated with different subjects in an image. Main subject detection enables a discriminative treatment of the scene content for a number of applications related to consumer photographic images, including automatic crop and zoom.

Conventional wisdom in the field of computer vision, which reflects how a human observer would perform such tasks as main subject detection and cropping, calls for a problem-solving path via object recognition and scene content determination according to the semantic meaning of recognized objects. However, generic object recognition remains a largely unsolved problem despite decades of effort from academia and industry.

The MSD system is built upon mostly low-level vision features with semantic information integrated whenever available. This MSD system has a number of sub-tasks, including region segmentation, perceptual grouping, feature extraction, and probabilistic and semantic reasoning. In particular, a large number of features are extracted for each segmented region in the image to represent a wide variety of visual saliency properties, which are then input into a tunable, extensible probability network to generate a belief map containing a continuum of values.

Using MSD, regions that belong to the main subject are generally differentiated from the background clutter in the image. Thus, automatic zoom and crop becomes possible. Automatic zoom and crop is a nontrivial operation that was considered impossible for unconstrained images, which do not necessarily contain uniform background, without a certain amount of scene understanding. In the absence of content-driven cropping, conventional systems have concentrated on simply using a centered crop at a fixed zoom (magnification) factor, or removing the uniform background touching the image borders. The centered crop has been found unappealing to customers.

The output of MSD used by the invention is a list of segmented regions ranked in descending order of their likelihood (or belief) as potential main subjects for a generic or specific application. This list can be readily converted into a map in which the brightness of a region is proportional to the main subject belief of the region. Therefore, this map can be called a main subject "belief" map. This "belief" map is more than a binary map that only indicates location of the determined main subject. The associated likelihood is also attached to each region so that regions with large values correspond to regions with high confidence or belief of being part of the main subject.

To some extent, this belief map reflects the inherent uncertainty for humans to perform such a task as MSD because different observers may disagree on certain subject matter while agreeing on other subject matter in terms of main subjects. However, a binary decision, when desired, can be readily obtained by using an appropriate threshold on the belief map. Moreover, the belief information may be very useful for downstream applications. For example, different weighting factors can be assigned to different regions (subject matters) in determining the amount of crop.

For determination of crop, the invention uses the main subject belief map instead of a binarized version of the map to avoid making a bad cropping decision that is irreversible. Furthermore, using the continuous values of the main subject beliefs helps trade-off different regions under the constraints encountered in cropping. A binary decision on what to include and what not to include, once made, leaves little room for trade-off. For example, if the main subject region is smaller than the crop window, the only reasonable choice, given a binary main subject map, is to leave equal amounts of margin around the main subject region. On the other hand, secondary main subjects are indicated by lower belief values in the main subject belief map, and can be included according to a descending order of belief values once the main subject of highest belief values are included. Moreover, if an undesirable binary decision on what to include/exclude is made, there is no recourse to correct the mistake. Consequently, the cropping result becomes sensitive to the threshold used to obtain the binary decision. With a continuous-valued main subject belief map, every region or object is associated with a likelihood of being included or a belief value in its being included.

To reduce the degrees of freedom in determining the amount of crop, and to limit the amount of resolution loss incurred in the zoom process, in particular for making photographic prints, in one embodiment, the invention restricts the set of allowable zoom factors to the range of [1.2, 4]. This is based on the findings in the customer focus studies. Those skilled in the art would recognize that the present invention could be used with any the zoom factor.

To reduce the degrees of freedom in determining the amount of crop, in particular for making photographic prints, in one embodiment, the invention restricts the set of allowable zoom factors to the range of [1.2, 4.0]. This is based on the findings in the customer focus studies. In addition, an extremely large zoom factor usually leads to blurry and unacceptable picture due to the limit imposed by the resolution of the original image. If a zoom factor determined by the present invention falls within the range of acceptable zoom factors (e.g., between 1.2 and 4.0), it will be used in the subsequent cropping process. Otherwise, the zoom factor is clipped to 1.2 at the lower end and 4.0 at the higher end.

General Description of Digital and Optical Printer System

Figure 1:
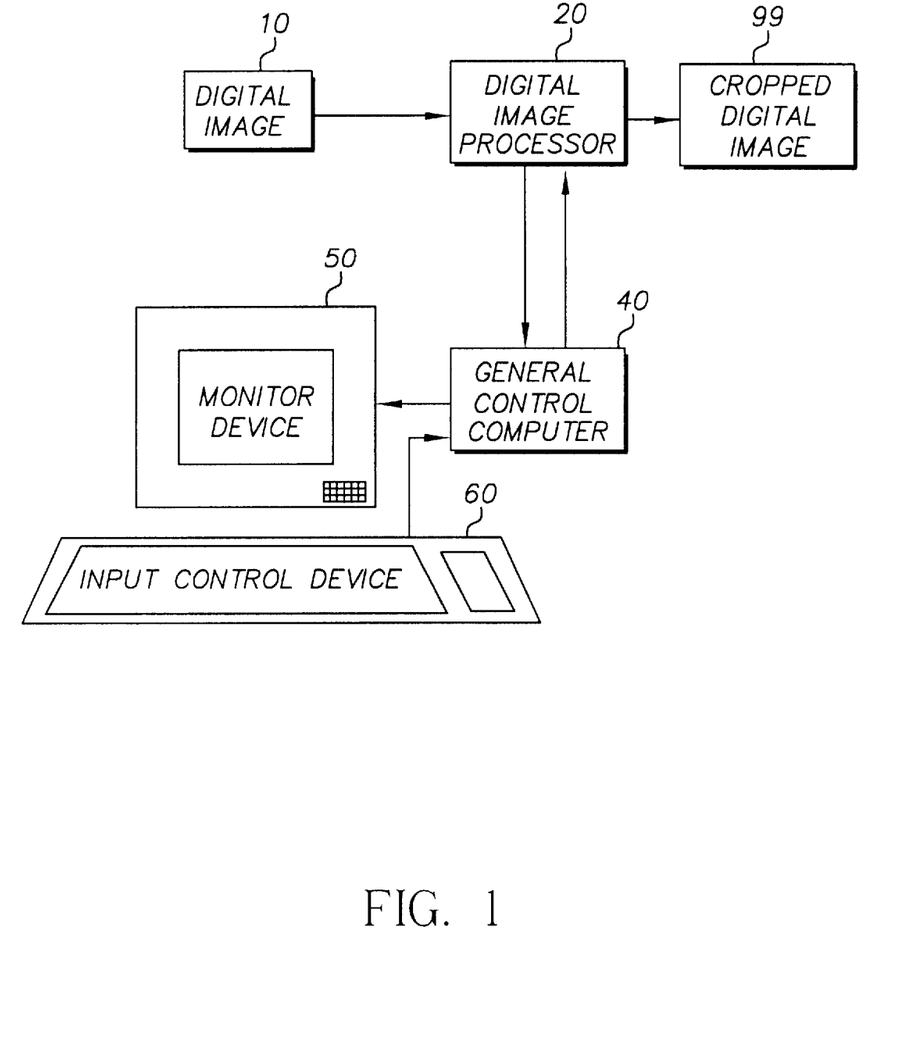
FIG. 1 is a schematic diagram of a system embodiment of the invention.

Referring to FIG. 1, the following description relates to a digital printing system. A source digital image 10 is received by a digital image processor 20. The digital image processor 20 may be connected to a general control computer 40 under operator control from an input control device 60. The monitor device 50 displays diagnostic information about the digital printing system. The general digital image processor 20 performs the needed image processing to produce a cropped and zoomed digital image 99.

Figure 1A:
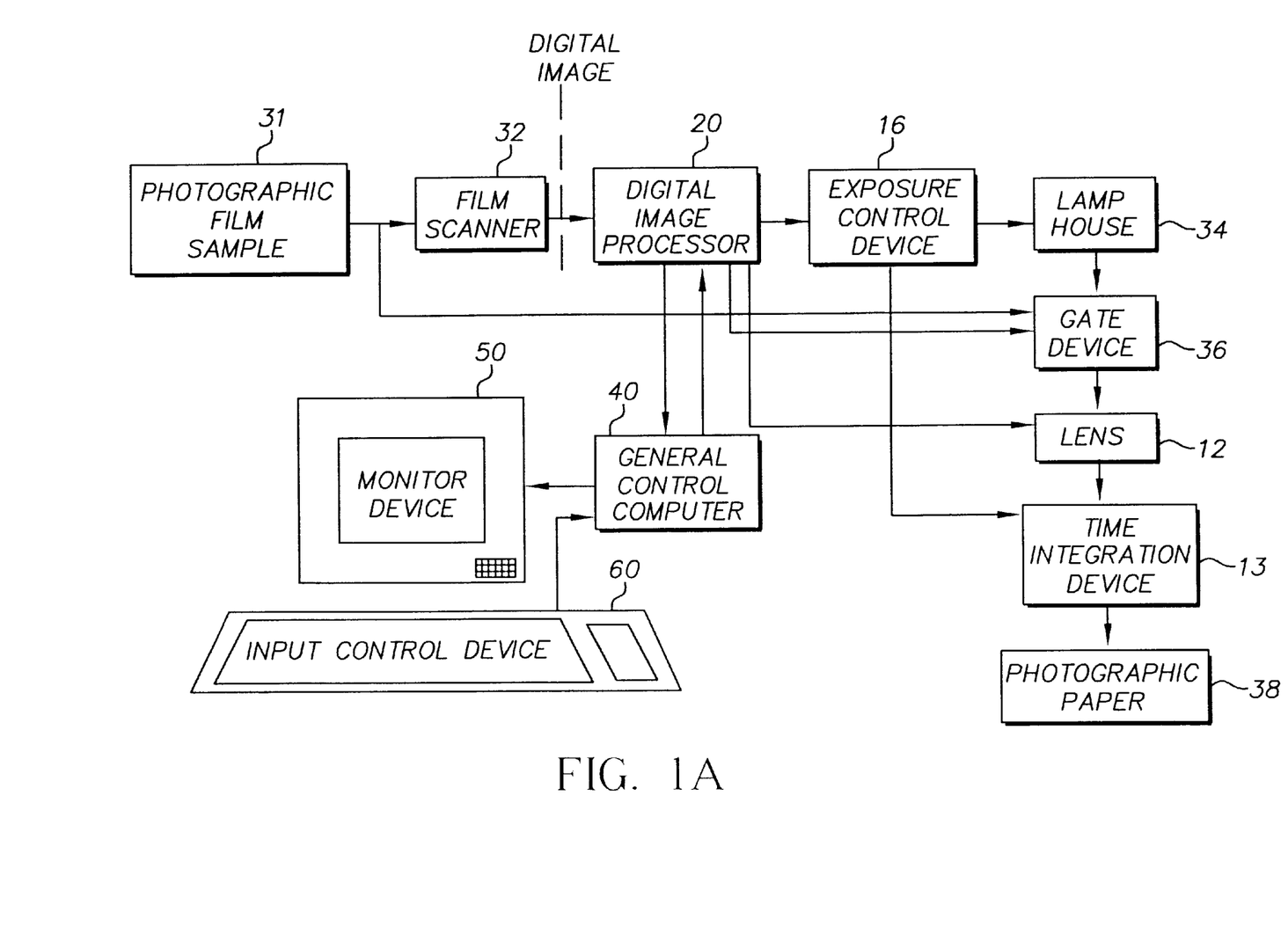

Referring to FIG. 1a, the following description relates to an optical printing system. A photographic film sample 31 is received by a film scanner 32 which produces a source digital image 10 relating to the spatial density distribution of the photographic film sample. This source digital image is received by a digital image processor 20. The digital image processor 20 may be connected to a general control computer 40 under operator control from an input control device 60. The monitor device 50 displays diagnostic information about the optical printing system. The general control computer 40 keeps track of the lens magnification setting.

Figure 2:
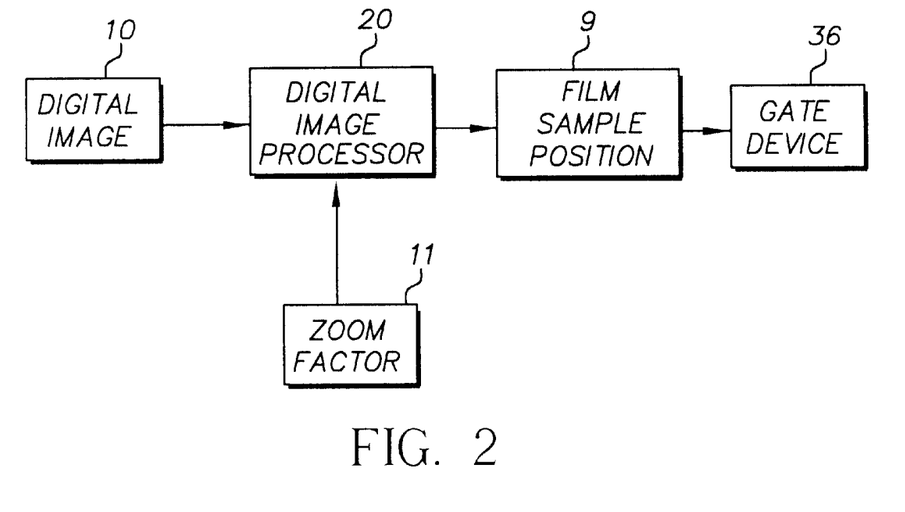
FIG. 2 is a schematic architectural diagram of an embodiment of the invention.

Referring to FIG. 2, a zoom factor 11, which corresponds to the lens magnification setting may also received by the image processor 20 from the general control computer 40 under operator control. The image processor 20 receives the source digital image 10 and uses the zoom factor 11 and the source digital image 10 to calculate the proper position for the photographic film sample in the form of a film sample position 9. The photographic film sample is positioned in a gate device 36 which holds the film negative in place during the exposure. The gate device 36 receives the film sample position 9 to position the photographic film sample to adjust which portion of the imaging area of the photograph will be printed.

Referring to FIG. 1a, a lamp house 34 provides the illumination source which is transmitted through the photographic film sample 31 and focused by a lens 12 onto photographic paper 38. The time integration device 13 opens and closes a shutter for a variable length of time allowing the focused light from the lamp house 34 to expose the photographic paper 38. The exposure control device 16 receives a brightness balance value from the digital image processor 20. The exposure control device 16 uses the brightness balance value to regulate the length of time the shutter of the time integration device stays open.

Figure 3:
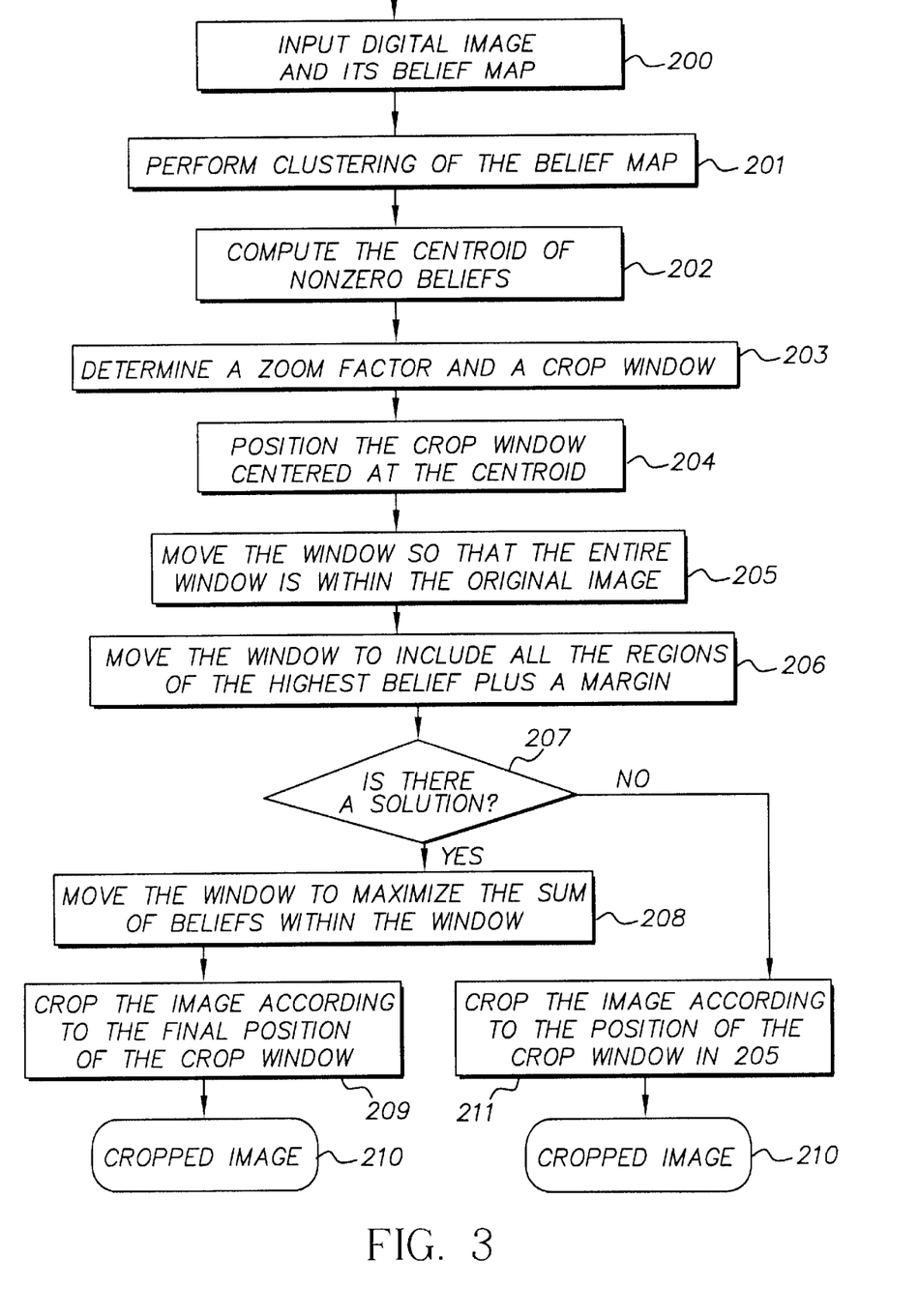
FIG. 3 is a schematic architectural diagram of an embodiment of the invention.

A block diagram of the inventive cropping process (e.g., the digital image understanding technology) is shown in FIG. 3, which is discussed in relation to FIGS. 5–12. FIGS. 5–12 illustrate the inventive process being applied to an original image shown in FIG. 5.

Figure 7:
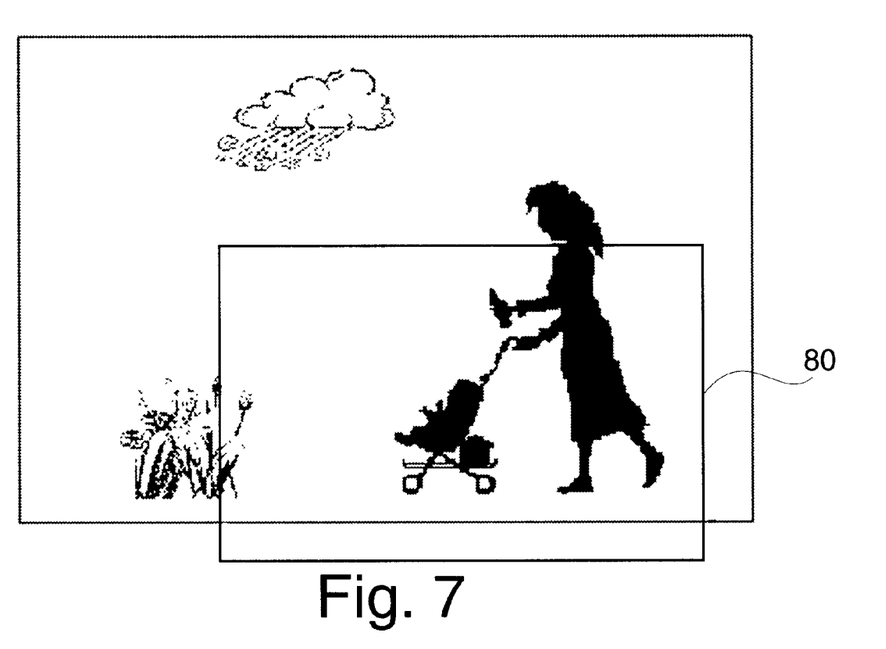
FIG. 7 illustrates the application of the invention to a simulated photograph.

In item 200, the belief map is created using MSD. The present invention automatically determines a zoom factor (e.g. 1.5×) and a crop window 80 (as shown in FIG. 7), as referred to in item 201 of FIG. 3. This zoom factor is selected by an automatic method based directly on the main subject belief map (e.g., an estimate of the size of the main subject). The crop window is typically a rectangular window with a certain aspect ratio. After the zoom factor is determined by the digital image processor 20, the value of the zoom factor is used subsequently by the digital image processor 20 shown in FIG. 1. In FIG. 1a, the zoom factor is used to communicate with the lens 12 to adjust the lens magnification setting. This adjustment allows the lens 12 to image the appropriate size of the photographic film sample 31 onto the photographic paper 38.

In item 201, regions of the belief map are clustered and the lowest belief cluster (e.g., the background belief) is set to zero using a predefined threshold. As discussed in greater detail below, sections of the image having a belief value below a certain threshold are considered background sections. In item 202 such sections are given a belief of zero for purposes of this embodiment of the invention.

Then, in item 202 the centroid, or center-of-mass (used interchangeably hereon forth), of nonzero beliefs are computed. More specifically, in FIG. 5 the subject having the highest belief in the belief map is the woman and the stroller. FIG. 7 illustrates that the centroid of this subject is approximately the top of the baby's head.

The centroid $(\hat{x},\hat{y})$ of a belief map is calculated using the following procedure:

$$\hat{x} = \sum_i x_i bel(x_i, y_i), \quad \hat{y} = \sum_i y_i bel(x_i, y_i),$$

where $x_i$ and $y_i$ denote that coordinates of a pixel in the belief map and $bel(x_i,y_i)$ represents the belief value at this pixel location.

Figure 4:
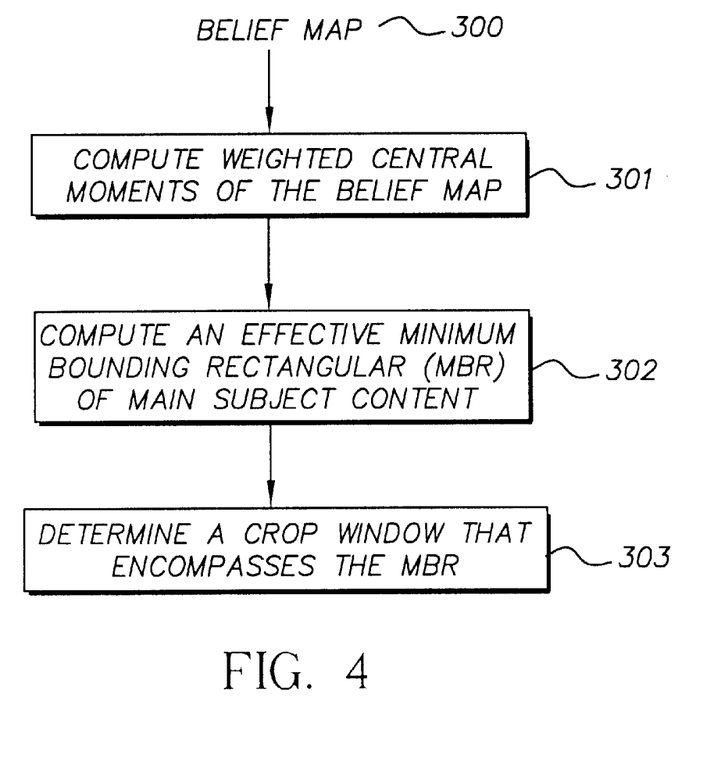
FIG. 4 is a schematic architectural diagram of an embodiment of the invention.
Figure 5:
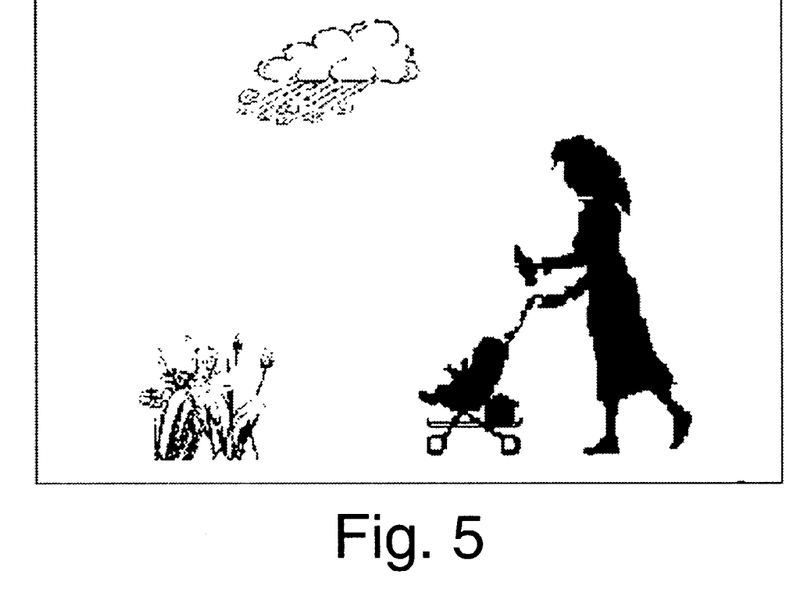
FIG. 5 illustrates the application of the invention to a simulated photograph.

Before the crop window is placed, a proper crop window is determined in item 203. Referring to FIG. 4, there is shown a block diagram of a method that automatically determines a zoom factor in response to the belief map. In item 301, two second-order central moments, $c_{xx}$ and $c_{yy}$, with respect to the center-of-mass, are computed using the following procedure:

$$c_{xx} = \frac{\sum_i (x_i - \hat{x})^2 \times bel(x_i, y_i)}{\sum_i bel(x_i, y_i)}, \quad c_{yy} = \frac{\sum_i (y_i - \hat{y})^2 \times bel(x_i, y_i)}{\sum_i bel(x_i, y_i)}.$$

Note that these two terms are not the conventional central moments that are computed without any weighting functions. In the preferred embodiment, a linear weighting function of the belief values is used. However, the conventional central moments, or central moments by a nonlinear function of the belief values, can also be used.

An effective bounding rectangle (MBR) of the regions of high subject content can be calculated using the following procedure, where the dimensions of the MBR are calculated by:

$$D_x = 2 \times \sqrt{3 \times c_{xx}}, \quad D_y = 2 \times \sqrt{3 \times c_{yy}}$$

Figure 6:
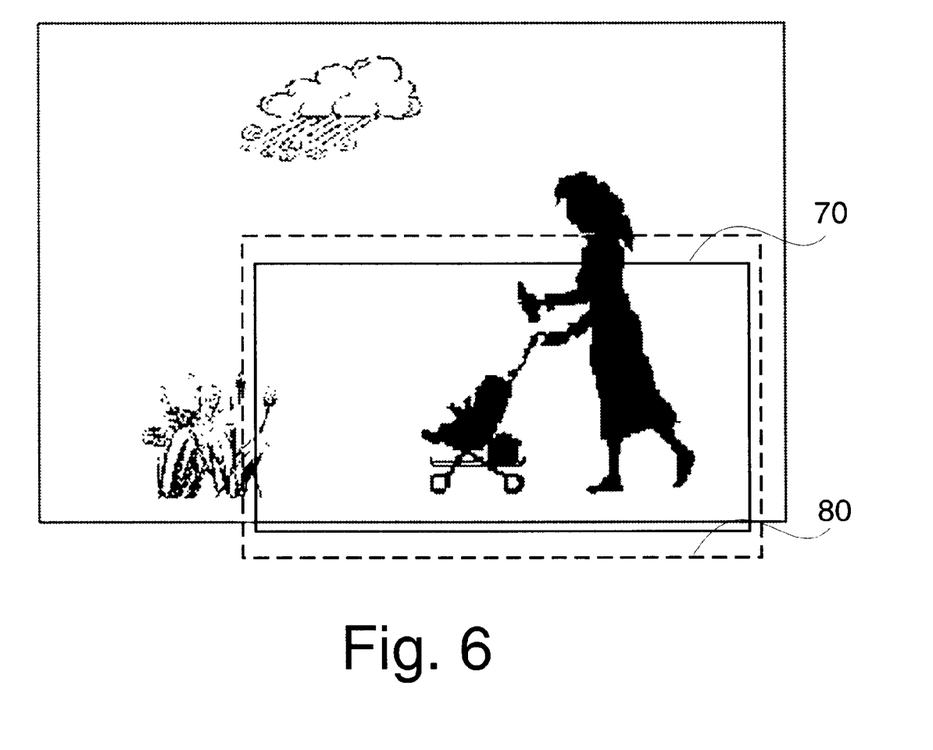
FIG. 6 illustrates the application of the invention to a simulated photograph.

FIG. 6 illustrates that the effective bounding rectangle 70 is centered at approximately the top of the boy's head and approximately encompasses the region of high subject content. In general, the aspect ratio of the original image is maintained. Therefore, a crop window 80 is determined in item 303 such that it is the smallest rectangle of the original aspect ratio that encompasses the effective MBR 70.

In item 204, the initial position of the crop window p 80 is centered at the centroid, as shown in FIG. 7.

Figure 8:
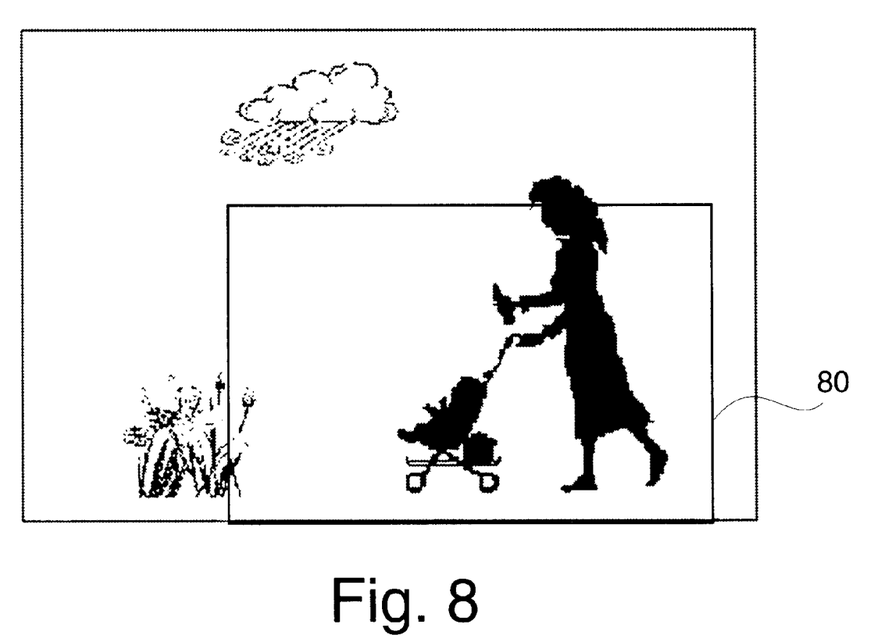
FIG. 8 illustrates the application of the invention to a simulated photograph.
Figure 9:
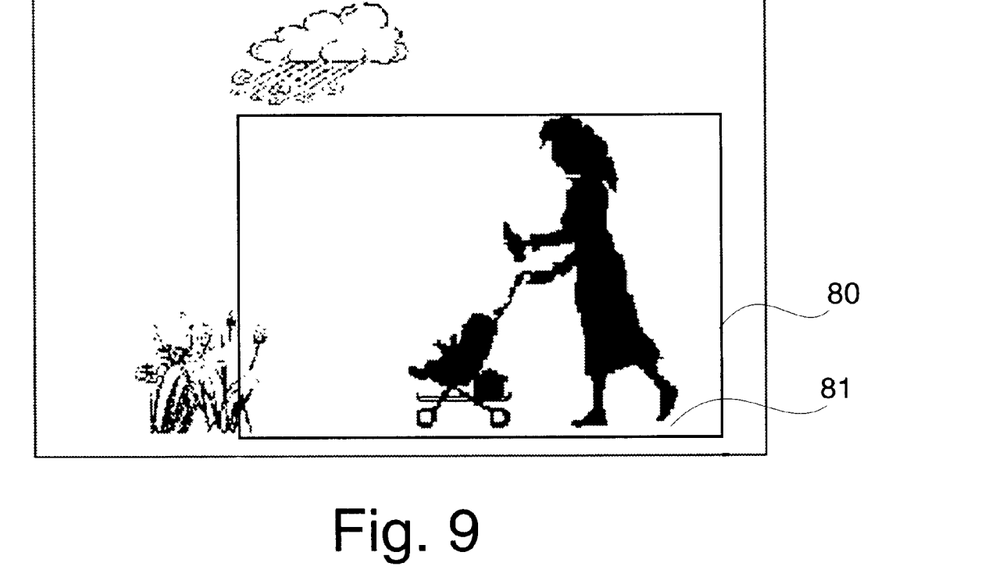
FIG. 9 illustrates the application of the invention to a simulated photograph.

The crop window is 80 then moved so that the entire crop window is within the original image (e.g. item 205) as shown in FIG. 8. In item 206, the crop window 80 is moved again so that all the regions of the highest belief values ("main subject") are included within the crop window and to create a margin 81, as shown in FIG. 9. This process (e.g., 206) captures the entire subject of interest. Therefore, as shown in FIG. 9, the top of the woman's head is included in the crop window. Compare this to FIG. 8 where the top of the woman's head was outside the crop window.

Decision box 207 determines whether an acceptable solution has been found, i.e., whether it is possible to include at least the regions of the highest belief values in the crop window.

Figure 10:
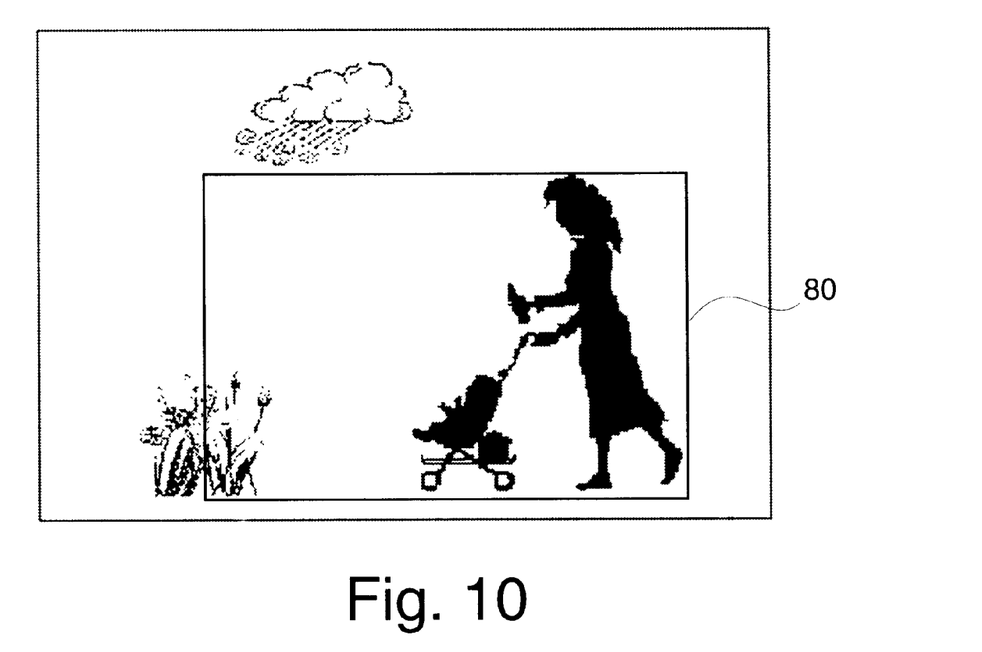
FIG. 10 illustrates the application of the invention to a simulated photograph.
Figure 11:
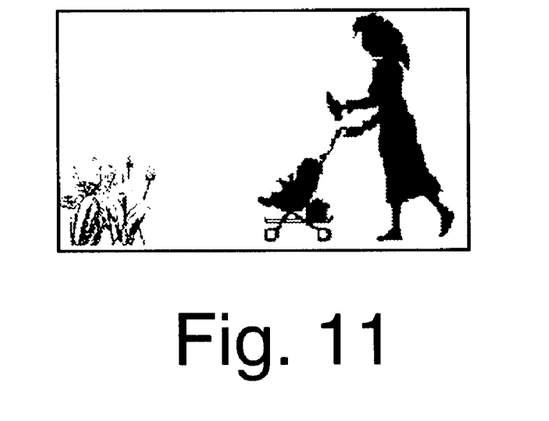
FIG. 11 illustrates the application of the invention to a simulated photograph.
Figure 12:
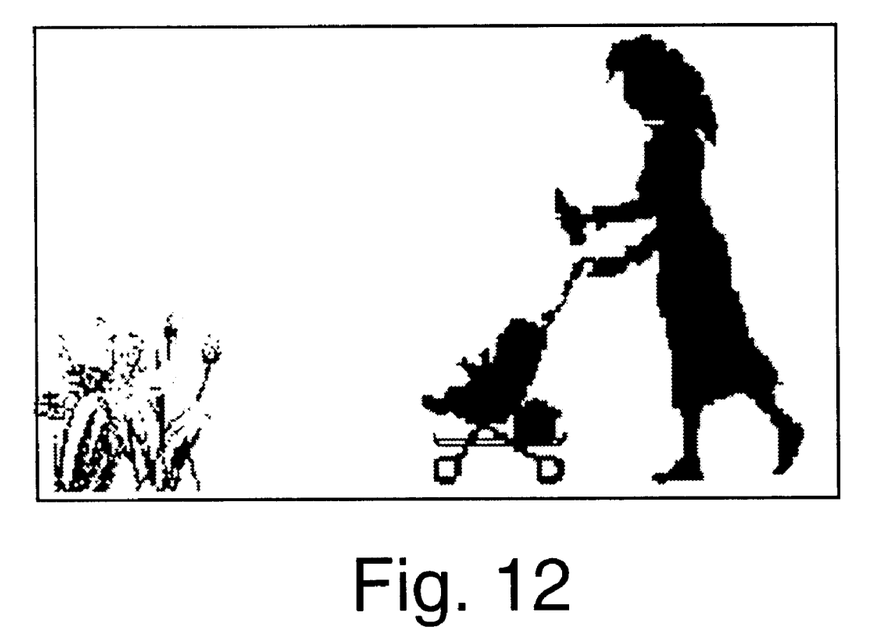
FIG. 12 illustrates the application of the invention to a simulated photograph.

If an acceptable solution exists, the window is again moved, as shown in item 208, to optimize a subject content index for the crop window. The preferred embodiment of the present invention defines the subject content index as the sum of belief values within the crop window. It should be noted that the present invention specifies higher numerical belief values corresponding to higher main subject probability. Therefore, finding a numerical maximum of the sum of the belief values is equivalent to finding an optimum of the subject content index. This is shown in FIG. 10 where the secondary objects (e.g. flowers) are included within the crop window 80 to increase the sum of beliefs. The sum of beliefs for a crop window is computed as follows.

$$sum(w) = \sum_{(x,y) \in w} bel(x, y),$$

where $bel(x, y)$ represents the belief value at a given pixel location (x, y) within the crop window w.

Provided that the primary subjects are included, moving the crop window so that more of the secondary subjects are included would increase the sum of belief values within the crop window. Recall that the primary subjects are indicated by the highest belief values and the secondary subjects are indicated by belief values lower than those of the primary subjects but higher than those of the background subjects. The goal is to find the crop window that has the highest sum of belief values while ensuring that the primary subjects are completely included in the crop window, i.e., $$\tilde{w} = \max_{w \in W} sum(w),$$

where W denotes the set of all possible crop windows that satisfy all the aforementioned constraints (e.g., those that are completely within the uncropped image and those that encompass the entire primary subjects).

Then, in item 212 (in place of item 209, not shown), the position of the center of the crop window is used to calculate the translational component of the film sample position 9. The gate device 36, shown in FIG. 1a, receives the film sample position 9 and uses this information to control the position of the photographic film sample 31 relative to the lens 12. Those skilled in the art will recognize that either or both of the lens 12 and the photographic film sample 31 may be moved to achieve the centering of the effective cropped image region on the photographic paper 38.

Referring to FIG. 3, if decision box 207 does not produce an acceptable solution, the final position of the crop window is restored to that of item 205. Then, referring to FIG. 1a, the position of the center of the crop window is used to calculate the translational component of the film sample position 9. The gate device 36, shown in FIG. 1, receives the film sample position 9 and uses this information to control the position of the photographic film sample 31 relative to the lens 12.

The simulated image example shown in FIGS. 5–12 illustrates the progress the invention makes as it moves through the process shown in FIG. 3. One could formulate the problem as a global exhaustive search for the best solution. The procedure used in the invention is considered a "greedy" searching approach and is certainly more efficient than conventional processes.

The invention utilizes a built-in "k-means" clustering process to determine proper thresholds of MSD beliefs for each application. The invention also uses clustering, as discussed below to enhance the cropping process. In one preferred embodiment, it is sufficient to use three levels to quantize MSD beliefs, namely "high", "medium", and "low." As would be known by one ordinarily skilled in the art, the invention is not limited to simply three levels of classification, but instead can utilize a reasonable number of classification levels to reduce the (unnecessary) variation in the belief map. These three levels allow for the main subject (high), the background (low), and an intermediate level (medium) to capture secondary subjects, or uncertainty, or salient regions of background. Therefore, the invention can perform a k-means clustering with k=3 on the MSD belief map to "quantize" the beliefs. Consequently, the belief for each region is replaced by the mean belief of the cluster in that region. Note that a k-means clustering with k=2 essentially produces a binary map with two clusters, "high" and "low," which is undesirable for cropping based on earlier discussion.

There are two major advantages in performing such clustering or quantization. First, clustering helps background separation by grouping low-belief background regions together to form a uniformly low-belief (e.g., zero belief) background region. Second, clustering helps remove noise in belief ordering by grouping similar belief levels together. The centroiding operation does not need such quantization (nor should it be affected by the quantization). The main purpose of the quantization used here is to provide a threshold for the background.

The k-means clustering effectively performs a multi-level thresholding operation to the belief map. After clustering, two thresholds can be determined as follows:

$$threshold_{low}=(C_{low}+C_{medium})/2,$$

$$threshold_{high}=(C_{medium}+C_{high})/2$$

where $\{C_{low}, C_{medium}, C_{high}\}$ is the set of centroids (average belief values) for the three clusters, and $threshold_{low}$ and $threshold_{high}$ are the low and high thresholds, respectively.

Regions with belief values below the lower threshold are considered "background" and their belief values are set to zero in items 202, 302 and 402 discussed above. Regions with belief values above the higher threshold are considered part of the main subject and need to be included in their entirety, whenever possible. Regions with intermediate belief values (e.g., less than or equal to the higher threshold and greater than or equal to the lower threshold) are considered part of the "secondary subject" and will be included as a whole or partially, if possible, to maximize the sum of main subject belief values retained by the crop window. Note that the variance statistics on the three clusters can be used to set the thresholds more accurately to reflect cluster dispersions.

The invention initializes the k-means process by finding the maximum value $bel_{maximum}$ and minimum values $bel_{minimum}$ of the belief map, computing the average value $bel_{average}$ of the maximum and minimum values for item in the belief map, and setting the initial centroids (denoted by a superscript of 0) at these three values, i.e., $$C_{low}^0, bel_{minimum}, C_{medium}^0=bel_{medium}, C_{high}^0=bel_{maximum}$$

Other ways of initialization may apply. For more about the k-means process, see Sonka, Hlavac, and Boyle, Image Procesing Analysis, and MachineVision, PWS Publishing, 1999 pagse 307–308. For typical MSD belief maps, the k-means process usually converges in fewer than 10 iterations.

In applications where a zoom version of the cropped area is desired, there are two scenarios to consider. First, the zoom version effectively requires higher spatial resolution than the highest resolution of the original data. However, a visible loss of image sharpness is likely of concern in the situation. Second, the zoom version effectively requires lower spatial resolution than the highest resolution of the original data. In both cases, the invention uses an interpolation process to resample the data in order to retain a maximum amount of image detail. In general, edge or detail-preserving image interpolation processes such as cubic-spline interpolation are preferred because they tend to preserve the detail and sharpness of the original image better.

Figure 13:
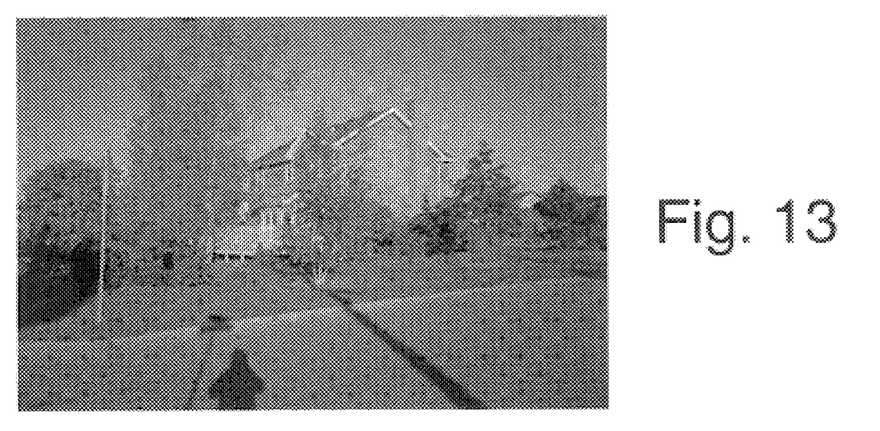
FIG. 13 is an exemplary uncropped photograph.
Figure 14:
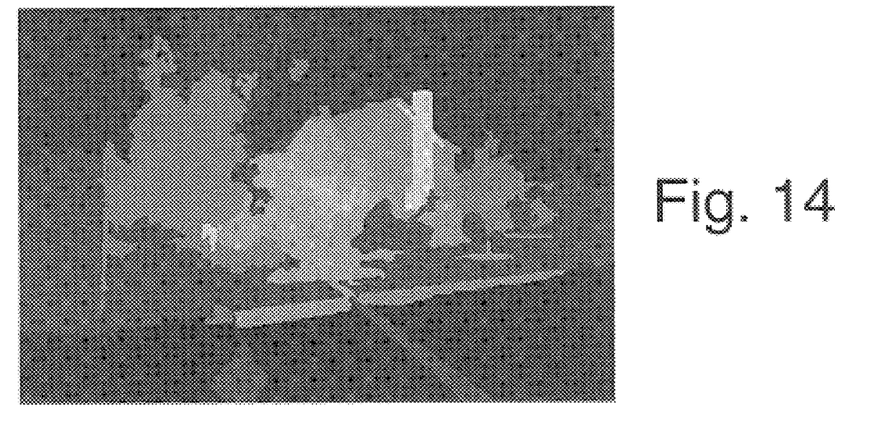
FIG. 14 is a belief map of the image shown in FIG. 13.
Figure 15:
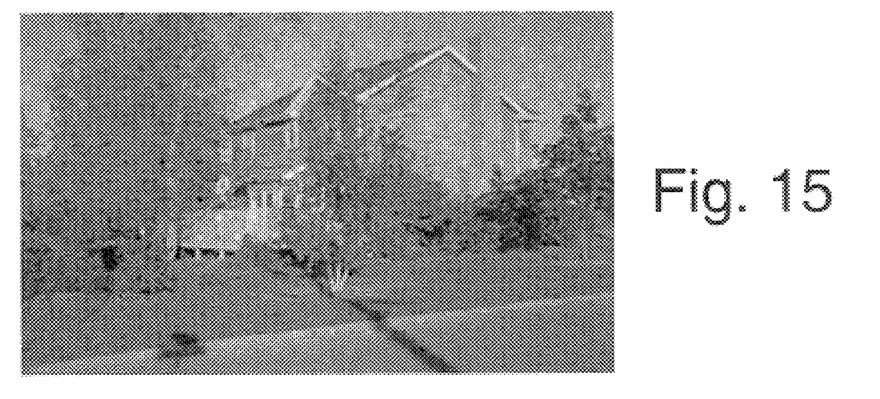
FIG. 15 is a cropped version of the image shown in FIG. 13.
Figure 16:
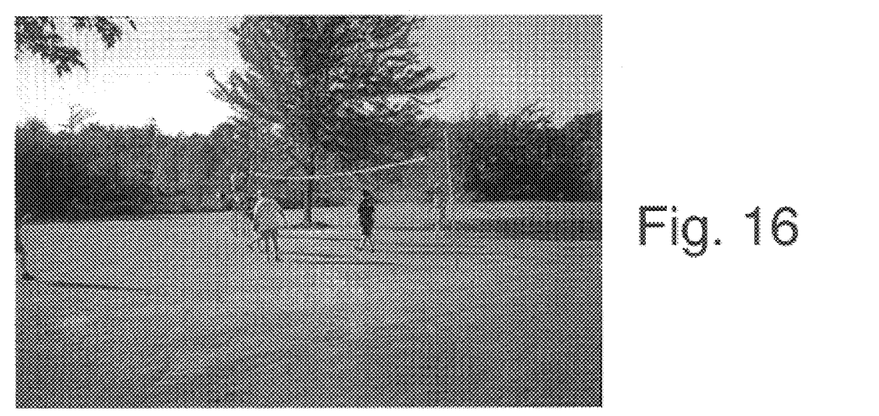
Figure 17:
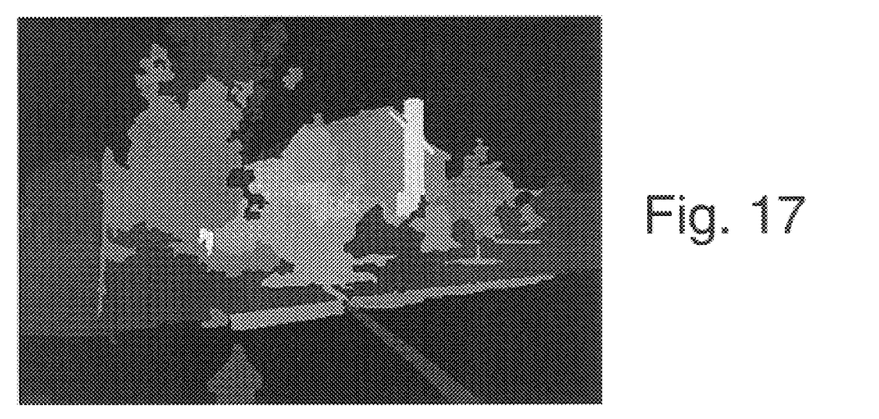
FIG. 17 is a belief map of the image shown in FIG. 16.
Figure 18:
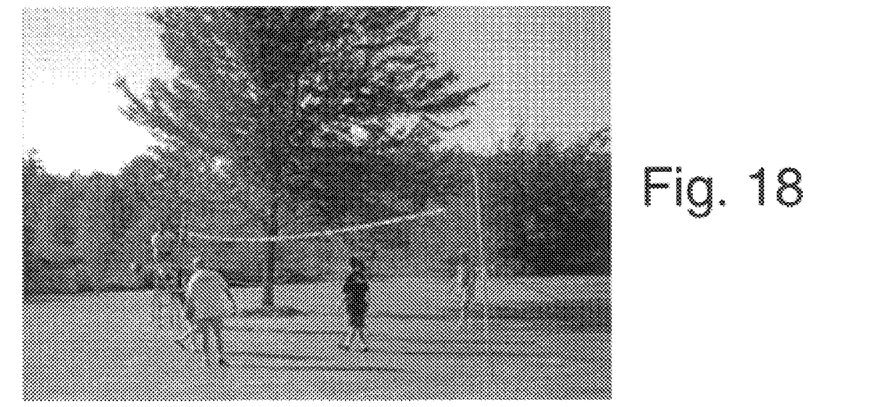
FIG. 18 is a cropped version of the image shown in FIG. 16.

Example consumer photographs and their various cropped versions are shown in pictures "house" (e.g., FIGS. 13–15) and "volleyball" (FIGS. 16–18). More specifically, FIGS. 13 and 16 illustrate uncropped original photographic images. FIGS. 14 and 17 illustrate belief maps, with lighter regions indicating higher belief values. As would be known by one ordinarily skilled in the art given this disclosure, the light intensity variations shown in FIGS. 14 and 17 are readily converted into numerical values for calculating the sum of the belief values discussed above. Finally, FIGS. 15 and 18 illustrate images cropped according to the invention.

For the "house" picture, both Bradley and Bollman (U.S. Pat. No. 5,978,519) would keep the entire image and not be able to produce a cropped image because of the shadows at the bottom and the tree extending to the top border of the uncropped image (FIG. 13). There are no continuous flat background regions extending from the image borders in this picture, as required by U.S. Pat. No. 5,978,519. Similarly, the top of the tree in FIG. 16 would not be cropped in the system disclosed in U.S. Pat. No. 5,978,519.

Secondary subjects can lead to a more balanced cropped picture. For the "volleyball" picture (FIG. 16), the inclusion of some parts of the tree by the algorithm leads to more interesting cropped pictures than simply placing the main subjects (players) in the center of the cropped image (FIG. 18). The invention was able to do so because the trees are indicated to be of secondary importance based on the belief map FIG. 17. It is obvious that the art taught by Bradley and Bollman in U.S. Pat. No. 5,978,519 would not be able to produce such a nicely cropped image. In fact, both Bradley and Bollman (U.S. Pat. No. 5,978,519) would at best remove the entire lower lawn portion of the picture and keep the tree branches in the upper-left of the uncropped image.

A computer program product may include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for practicing a method according to the present invention.

While the invention has been described in terms of preferred embodiments, those skilled in the art will recognize that the invention can be practiced with modification within the spirit and scope of the appended claims.

The subject matter of the present invention relates to digital image understanding technology, which is understood to mean technology that digitally processes a digital image to recognize and thereby assign useful meaning to human understandable objects, attributes or conditions and then to utilize the results obtained in the further processing of the digital image.

The invention has been described in detail with particular reference to certain preferred embodiments thereof, but it will be understood that variations and modifications can be effected within the spirit and scope of the invention.

PARTS LIST

| | |
|---|---|
| 9 | film sample position |
| 10 | source digital image |
| 11 | zoom factor |
| 12 | lens |
| 13 | time integration device |
| 20 | digital image processor |
| 31 | photographic film sample |
| 32 | film scanner |
| 34 | lamp house |
| 36 | gate device |
| 38 | photographic paper |
| 40 | general control computer |
| 50 | monitor device |
| 60 | input control device |
| 80 | crop window |
| 81 | margin |
| 99 | cropped digital image |
| 200 | image and belief map |
| 201 | decision box for performing clustering of the belief map |
| 202 | decision box for computing the center-of-mass |
| 203 | decision box for determining a zoom factor and a crop window |
| 204 | decision box for positioning the crop window |
| 205 | decision box moving a window |
| 206 | decision box for moving a window to contain the highest belief |
| 207 | decision box for determining if a solution exists |
| 208 | decision box for moving a window to optimize the sum of beliefs |
| 209 | decision box for cropping the image |
| 210 | cropped image |
| 211 | decision box for cropping the image |
| 300 | belief map |
| 301 | decision box for computing weighted central moments of the belief map with respect to the center-of-mass |
| 302 | decision box for computing an effective bounding rectangle (MBR) of the main subject content |
| 303 | decision box for determining a zoom factor and a crop window that encompasses the MBR |

What is claimed is:

1. A method of producing an image of at least a portion of a digital image, comprising:
    a) providing a digital image having pixels;
    b) computing a belief map of the digital image by using the pixels of the digital image to determine a series of features and using such features to assign a probability of a location of a main subject of the digital image in the belief map;
    c) determining a crop window having a shape factor and a zoom factor, the shape and the zoom factors determining a size of the crop window; and
    d) cropping the digital image to include a portion of the image of high subject content in response to the belief map and the crop window.

2. The method of claim 1 wherein determining the crop window includes
    i) computing a weighted center-of-mass of the belief map, weighted by belief values of the belief map;
    ii) computing weighted central moments of the belief map relative to the center-of-mass and weighted by a weighting function of each belief value of the belief map;
    iii) computing an effective rectangular bounding box according to the central moments; and
    iv) determining a crop window having a shape and a zoom factor, the shape and the zoom factors determining a size of the crop window.

3. The method of claim 1 wherein cropping the digital image includes
    i) selecting an initial position of the crop window at a location which includes a center of mass;
    ii) using belief values corresponding to the crop window to select the position of the crop window to include a portion of the image of high subject content in response to the belief map; and
    iii) cropping the digital image according to the position of the crop window.

4. The method of claim 2 wherein cropping the digital image includes
    i) selecting a crop window of a rectangular shape and of a similar aspect ratio to the digital image; and
    ii) selecting a zoom factor to determine the size of the crop window such that the crop window encompasses the effective bounding box.

5. The method of claim 2 wherein the weighting function of computing a belief map is a linear weighting function.

6. The method of claim 2 wherein the weighting function of computing a belief map is a constant function.

7. The method of claim 3 wherein computing a belief map includes
    i) calculating a subject content index value for the crop window derived from the belief values;
    ii) following a positioning procedure of repeating selecting an initial position of the crop window for at least two positions of the crop window; and
    iii) using the subject content index values to select the crop window position.

8. The method of claim 1 wherein the crop window is completely within the digital image.

9. The method of claim 2 wherein computing a belief map includes clustering of the belief map to identify at least a cluster of highest belief values corresponding to the main subject, a cluster of intermediate belief values corresponding to secondary subjects, and a cluster of lowest belief values corresponding to background.

10. The method of claim 9 wherein clustering includes setting background portions to a zero belief value.

11. The method of claim 5 further comprising positioning the crop window such that the subject content index of the crop window is at an optimum.

12. The method of claim 3 further comprising positioning the crop window such that the crop window includes all of the main subject cluster.

13. The method of claim 12 further comprising positioning the crop window to include a buffer around the main subject cluster.

14. A computer storage product having at least one computer storage medium having instructions stored therein causing one or more computers to perform the method of claim 1.

15. A method of producing an image of a portion of at least a portion of a photographic image onto a photographic receiver, comprising:
   a) receiving a digital image corresponding to the photographic image, the digital image including pixels;
   b) computing a belief map of the digital image by using the pixels of the digital image to determine a series of features and using such features to assign a probability of a location of a main subject of the digital image in the belief map;
   c) determining a crop window having a shape factor and a zoom factor, the shape and the zoom factors determining a size of the crop window; and
   d) locating a relative optical position of a photographic image, a lens assembly, and a photographic receiver in response to the belief map and illuminating a portion of the photographic image of high subject content to produce an image of such portion on the photographic receiver.

16. The method of claim 15 wherein determining a crop window includes
   i) computing a weighted center-of-mass of the belief map, the weighted center-of-mass weighted by the belief values of the belief map;
   ii) computing weighted central moments of the belief map, relative to the center-of-mass and weighted by a weighting function of each belief value of the belief map;
   iii) computing an effective rectangular bounding box according to the central moments; and
   iv) determining a crop window having a shape factor and a zoom factor, the shape and the zoom factors determining a size of the crop window.

17. The method of claim 15 wherein locating the relative optical position of a photographic image, a lens assembly, and a photographic receiver includes
   i) selecting an initial position of the crop window at a location which includes the center-of-mass;
   ii) using the belief values corresponding to the crop window to select the position of the crop window to include a portion of the image of high subject content in response to the belief map; and
   iii) cropping the digital image according to the position of the crop window.

18. The method of claim 16 wherein locating the relative optical position of a photographic image, a lens assembly, and a photographic receiver includes
   i) selecting a crop window of a rectangular shape and of an identical aspect ratio to the digital image; and
   ii) selecting a zoom factor to determine the size of the crop window such that the crop window encompasses the effective bounding box.

19. The method of claim 16 wherein the weighting function of computing weighted central moments of the belief map is a linear weighting function.

20. The method of claim 16 wherein the weighting function of computing weighted central moments of the belief map is a constant function.

21. The method of claim 17 wherein computing a belief map of the digital image includes
   i) calculating a subject content index value for the crop window derived from the belief values;
   ii) following a positioning process of repeating selecting an initial position of the crop window at a location which includes the center of the mass for at least two positions of the crop window; and
   iii) using the subject content index values to select the crop window position.

22. The method of claim 15 wherein the crop window is completely within the digital image.

23. The method of claim 16 wherein computing a belief map of the digital image includes clustering of the belief map to identify at least a cluster of highest belief values corresponding to the main subject, a cluster of intermediate belief values corresponding to secondary subjects, and a cluster of lowest belief values corresponding to background.

24. The method of claim 23 wherein clustering includes setting background portions to a zero belief value.

25. The method of claim 19 further comprising positioning the crop window such that the subject content index value of the crop window is at an optimum.

26. The method of claim 17 further comprising positioning the crop window such that the crop window includes all of main subject cluster.

27. The method of claim 26 further comprising positioning the crop window to include a buffer around main subject cluster.

28. A computer storage product having at least one computer storage medium having instructions stored therein causing one or more computers to perform the method of claim 15.

* * * * *